(12) United States Patent
Watanabe et al.

(10) Patent No.: US 11,052,837 B2
(45) Date of Patent: Jul. 6, 2021

(54) WIRE HARNESS

(71) Applicant: YAZAKI CORPORATION, Tokyo (JP)

(72) Inventors: Jin Watanabe, Makinohara (JP); Naoyuki Yoshida, Makinohara (JP); Shouya Shinogaya, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/581,687

(22) Filed: Sep. 24, 2019

(65) Prior Publication Data

US 2020/0101911 A1 Apr. 2, 2020

(30) Foreign Application Priority Data

Sep. 28, 2018 (JP) .............................. JP2018-185122
Sep. 12, 2019 (JP) .............................. JP2019-166554

(51) Int. Cl.
| | | |
|---|---|---|
| *B60R 16/02* | (2006.01) | |
| *H01R 13/73* | (2006.01) | |
| *H01B 7/00* | (2006.01) | |
| *H02G 3/30* | (2006.01) | |
| *H01R 13/631* | (2006.01) | |

(52) U.S. Cl.
CPC ....... *B60R 16/0215* (2013.01); *H01B 7/0045* (2013.01); *H01R 13/631* (2013.01); *H01R 13/73* (2013.01); *H02G 3/30* (2013.01); *H01R 2201/26* (2013.01)

(58) Field of Classification Search
CPC ............ H01R 13/5833; H01R 13/6392; H01R 13/518; H01R 13/639; H01R 13/73; H01R 13/631; H01R 25/162; H01R 27/00; H01R 31/06; H01R 2103/00; H01R 2201/26; B60R 16/0215; H01B 7/0045; H02G 3/30
USPC ....... 439/456–459, 368, 369, 533, 954, 224, 439/218, 215
See application file for complete search history.

(56) References Cited

U.S. PATENT DOCUMENTS

| | | | | |
|---|---|---|---|---|
| 4,671,600 | A * | 6/1987 | Sawai ................. | F15B 13/0857 439/221 |
| 5,573,432 | A * | 11/1996 | Hatagishi ........... | H01R 13/4361 439/459 |
| 5,921,805 | A * | 7/1999 | Tabata ............... | H01R 13/5804 439/457 |
| 5,941,628 | A * | 8/1999 | Chang ................. | F21V 19/0005 362/249.01 |
| 6,050,840 | A * | 4/2000 | Kowalski ........... | H01R 13/6392 439/369 |

(Continued)

FOREIGN PATENT DOCUMENTS

JP 2015-230873 A 12/2015

*Primary Examiner* — Gary F Paumen
(74) *Attorney, Agent, or Firm* — Kenealy Vaidya LLP

(57) ABSTRACT

A wire harness is provided. The wire harness includes a connector holder, a connector held in the connector holder, and an electric wire extending from the connector toward a predetermined routing direction. The electric wire is to be held at a predetermined attachment position on an outer wall surface of the connector such that the electric wire extends toward the routing direction passing through the attachment position. The attachment position is configured to be changeable to a plurality of different positions according to the routing direction.

9 Claims, 13 Drawing Sheets

(56) References Cited

U.S. PATENT DOCUMENTS

| | | | | |
|---|---|---|---|---|
| 6,231,375 B1* | 5/2001 | Kashiyama | ........... | H01R 9/2416 |
| | | | | 439/456 |
| 6,296,516 B1* | 10/2001 | Kuo | .................. | H01R 13/5812 |
| | | | | 439/459 |
| 6,341,881 B1* | 1/2002 | Huang | ................ | F21V 19/0005 |
| | | | | 362/249.01 |
| 6,375,493 B1* | 4/2002 | Lin | .................... | H01R 13/5841 |
| | | | | 439/457 |
| 6,478,607 B2* | 11/2002 | Tabata | ............... | H01R 13/5812 |
| | | | | 439/456 |
| 6,537,106 B1* | 3/2003 | Follingstad | ............ | H01R 13/74 |
| | | | | 439/534 |
| 6,957,970 B2* | 10/2005 | Weigel | ............... | H01R 13/5219 |
| | | | | 439/277 |
| 8,174,379 B2* | 5/2012 | Black | .................... | H01R 25/00 |
| | | | | 340/538 |
| 8,444,425 B2* | 5/2013 | Byrne | ................. | H01R 13/112 |
| | | | | 439/215 |
| 8,790,126 B2* | 7/2014 | Byrne | ..................... | H02G 3/00 |
| | | | | 439/215 |
| 2008/0160824 A1* | 7/2008 | Liu | ...................... | H01R 13/567 |
| | | | | 439/456 |
| 2017/0057434 A1 | 3/2017 | Nohara et al. | | |

\* cited by examiner

DIRECTION OF VEHICLE

WIRE HARNESS

CROSS-REFERENCE TO RELATED APPLICATIONS

This application is based on and claims priority under 35 USC 119 from Japanese Patent Applications No. 2018-185122 filed on Sep. 28, 2018 and No, 2019-166554 filed on Sep. 12, 2019, the contents of which are incorporated herein by reference.

TECHNICAL FIELD

The present invention relates to a wire harness which includes a plurality of electric wires each provided with a connector at a tip end thereof.

BACKGROUND ART

A wire harness mounted on a vehicle such as an automobile is generally configured as an assembly obtained by bundling, for example, a plurality of sub-harnesses respectively prepared for each system. The sub-harnesses to be bundled are prepared according to various required specification of the wire harness.

Specifically, there are a wide variety of electrical components to be mounted in vehicles corresponding to vehicle types, vehicle grades, and optional equipment (an acoustic system, a power window system, etc.) selected according to a demand of a vehicle customer (driver). Therefore, electric wires (circuit lines) configuring power supply lines, ground lines, signal lines, and communication lines which are to be connected to the various electrical components, are variously different. In order to cope with such differences in electric wires, a bundle of electric wires to be mounted standardly (standard circuit lines) is provided as a standard sub-harness so as to operate a drive system in units of the drive system such as an engine and a motor. Further, in order to operate optional equipment or the like to be selectively mounted, a bundle of electric wires (selection electric wires) to be mounted selectively and additionally is provided as an optional sub-harness.

In recent years, application of Information Technology (IT) to vehicles such as automatic driving technology and external environment detection technology is rapidly advancing, and both standard electric wires and selection electric wires are tending to increase with the introduction of IT. That is, the number of types (kind) of sub-harnesses that needs to be prepared in advance is increasing significantly when mounting wire harnesses in a vehicle.

Therefore, in order to reduce the increase in the number of types of sub-harnesses, it is known to construct a wire harness with a circuit substrate and a plurality of sub-harnesses by connecting the plurality of sub-harnesses to the circuit substrate and connecting the electric wires of each sub-harness to each other through a circuit pattern on the circuit substrate (for example, with reference to Patent Literature 1). In the type of wire harness, circuits such as branches can be provided in the circuit substrate for both the standard sub-harness and the optional sub-harness.

CITATION LIST

Patent Literature

Patent Literature 1: JP-A-2015-230873

SUMMARY OF INVENTION

In the wire harness of Patent Literature 1 described above, there is no need to provide branches in both the standard sub-harness and the optional sub-harness by using the circuit substrate. Therefore, a shape of the sub-harness is simplified without branches and the whole system can be standardized.

Tastes and hobbies of vehicles for each customer are extremely detailed and are more and more diverse. The increase in selection electric wires to be selectively added depending on the type and grade of a predetermined vehicle may be significant. Therefore, it is assumed in the future that there is a demand to standardize even the optional sub-harnesses configured by selection electric wires and reduce the number of types thereof. One of the standard methods is to make lengths of the optional sub-harnesses as uniform as possible. Then, it is considered to set a length of the electric wire of the sub-harness relatively long in order to be able to cope with various routing widely. However, it may be assumed that a length of the electric wire to be actually routed may be adjusted to be short on the spot when manufacturing or routing a wire harness including the sub-harnesses. That is, an excess length of the electric wires is desired to be absorb and routed without changing the length of the electric wire.

The present invention is made in view of the above circumstances and an object thereof is to provide a wire harness capable of absorbing and routing an excess length of the electric wire without changing the length of the electric wire of the wire harness.

The object of the present invention is achieved by the following configurations.

[1] A wire harness includes: a connector holder; a connector to be held by the connector holder; and an electric wire extending from the connector toward a predetermined routing direction, wherein the electric wire is to be held at a predetermined attachment position on an outer wall surface of the connector such that the electric wire extends toward the routing direction passing through the attachment position, and the attachment position is configured to be changeable to a plurality of different positions according to the routing direction.

[2] The wire harness described in [1] further includes: a mating electric wire which is branched form a trunk line and is provided with a mating connector at a tip end thereof, wherein the connector is fittable to the mating connector, and the electric wire is to be connected to the mating electric wire via the connector and the mating connector.

[3] The wire harness described in [2] further includes: an attachment that regulates a posture of the connector with respect to the connector holder, wherein the connector is to be held by the connector holder via the attachment, and the attachment is to be held by the connector holder in a state where a posture of the connector is regulated such that the electric wire is drawn into a space inside the connector holder.

[4] In the wire harness described in [3], the connector is configured such that the electric wire extends rearward in a fitting direction with the mating connector, the attachment includes a first wall to be held by the connector holder, and a second wall erected from the first wall, the attachment regulates the posture of the connector such that the first wall is positioned forward than the connector in the fitting direction, and the second wall is positioned in a direction intersecting the fitting direction of the connector, and the electric wire is drawn into the space inside the connector holder while crossing the second wall, and is connected to the connector after being bent in the space.

[5] In the wire harness described in [3], the connector is configured such that the electric wire extends rearward in a fitting direction with the mating connector, the attachment includes a first wall, a second wall that is erected from one end of the first wall and is held by the connector holder, and a third wall that is erected from the other end of the first wall and faces the second wall, the attachment regulates the posture of the connector such that the first wall is positioned forward than the connector in the fitting direction, and the second wall and the third wall are positioned in a direction intersecting the fitting direction of the connector, and the electric wire is drawn into the space inside the connector holder while crossing the third wall, and is connected to the connector after being bent in the space.

[6] In the wire harness described in [1] or [2], the connector includes a plurality of engagement portions engageable with the connector holder, and the attachment position is to be changed to a position according to the routing direction by selectively engaging one of the plurality of engagement portions with the connector holder.

[7] In the wire harness described in [1] or [2], the connector includes a plurality of engagement portions engageable with the electric wire, and the attachment position is to be changed to a position according to the routing direction by selectively locking the electric wire to one of the plurality of engagement portions.

[8] The wire harness described in [1] or [2] further includes one attachment selected form a plurality of types of attachments each of which includes a fixed wall to be engaged with the connector holder and a support wall to be engaged with the connector, and in which the support wall is inclined at different angles with respect to the fixed wall, wherein the attachment position is to be changed to a position according to the routing direction by holding the connector by the connector holder via the one attachment selected from the plurality of types of attachments.

[9] In the wire harness described in [2], the trunk line is routed along a vehicle front-rear direction, and the electric wire is routed along a vehicle width direction.

According to the wire harness described in the above [1], the attachment position of the electric wire in the connector can be changed to a plurality of different positions according to the routing direction of the electric wire. Accordingly, an extra length of the electric wire (that is, a length drawn from the connector holder) can be adjusted without changing the length of the electric wire. As a result, the length of the electric wire can be made as uniform as possible, which can contribute to standardization of the wire harness.

According to the wire harness described in the above [2], the mating electric wire branched from the trunk line and provided with the mating connector at the tip end thereof is connected to the electric wire via the connector. Further, the extra length (that is, the drawn length) of the electric wire can be adjusted without changing the length of the electric wire. As a result, the length of the electric wire can be made as uniform as possible, which can contribute to standardization of the wire harness.

According to the wire harness described in the above [3], the posture of the connector is regulated such that the electric wire is drawn into the space inside the connector holder. Therefore, the extra length of the electric wire can be accommodated in the connector holder. Accordingly, for example, it is possible to prevent occurrence of abnormal noise caused by the extra length of the electric wire contacting a peripheral member.

According to the wire harness described in the above [4], the attachment which includes the first wall and the second wall regulates the posture of the connector, and the attachment (specifically, the first wall) is held by the connector holder. Further, by the holding, the electric wire is drawn into the space inside the connector holder while crossing the second wall, and is connected to the connector after being bent in the space. Therefore, the electric wire can be routed after the degree of bending of the electric wire and the extra length to be accommodated in the connector holder are determined systematically.

According to the wire harness described in the above [5], the attachment which includes the first wall, the second wall and the third wall regulates the posture of the connector, and the attachment (specifically, the third wall) is held by the connector holder. Further, by the holding, the electric wire is drawn into the space inside the connector holder while crossing the third wall, and is connected to the connector after being bent in the space. Therefore, the electric wire can be routed after the degree of bending of the electric wire and the extra length to be accommodated in the connector holder are determined systematically.

According to the wire harness described in the above [6], the engagement portions are selectively engaged with the connector holder to change the posture of the connector, and thus the attachment position of the electric wire can be arranged at a plurality of different positions according to the routing direction.

According to the wire harness described in the above [7], the attachment position of the electric wire can be arranged at a plurality of different positions according to the routing direction by selectively locking the electric wire to the plurality of engagement portions of the connector.

According to the wire harness described in the above [8], the attachment position of the electric wire can be arranged at a plurality of different positions according to the routing direction by holding the connector by the connector holder via the one attachment selected from the plurality of types of attachments with different angles between the fixed wall and the support wall.

The wire harness configured as in the above (9) is particularly useful in a case of using wire harnesses of the same part number in a plurality of vehicle types with different vehicle widths. The reason is that the wire harness of the present invention can fit the vehicle width for each vehicle type by one type of sub-harness (electric wire).

According to the present invention, a wire harness can be provided which is capable of absorbing and routing the extra length of the electric wire without changing the length of the electric wire of the wire harness.

The present invention has been briefly described above. Further, details of the present invention will be clarified by reading a mode (hereinafter, referred to as "embodiment")

for carrying out the invention to be described below with reference to accompanying drawings.

DESCRIPTION OF EMBODIMENTS

A plurality of specific embodiments of the wire harness of the present invention will be described below with reference to each drawing.

First Embodiment

Figure 1:
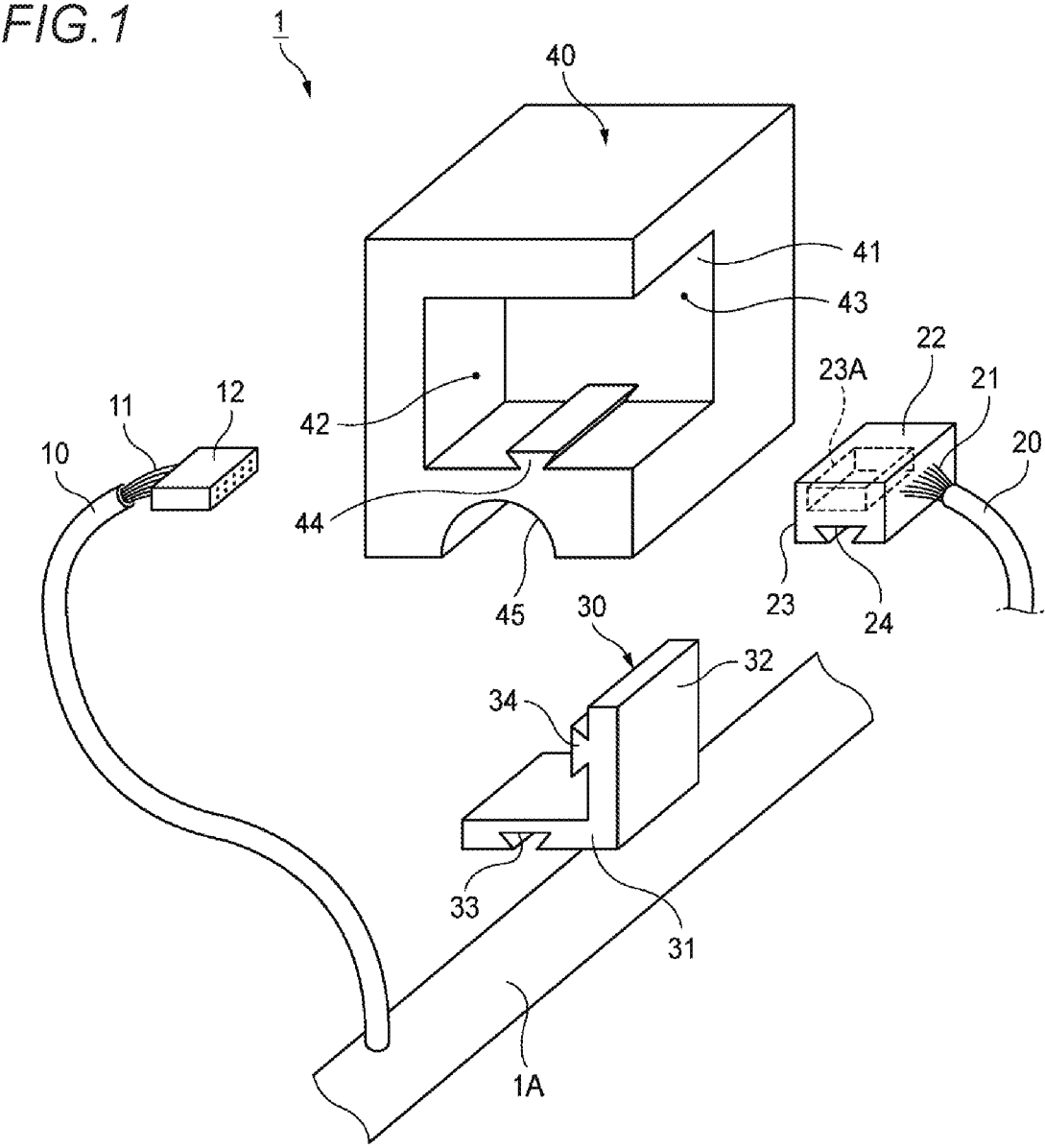
FIG. 1 is a perspective view illustrating a wire harness according to a first embodiment of the present invention.
Figure 1:
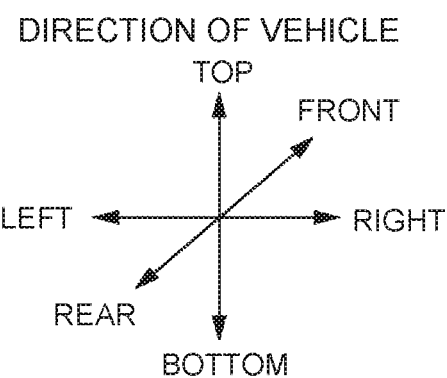
Figure 2:
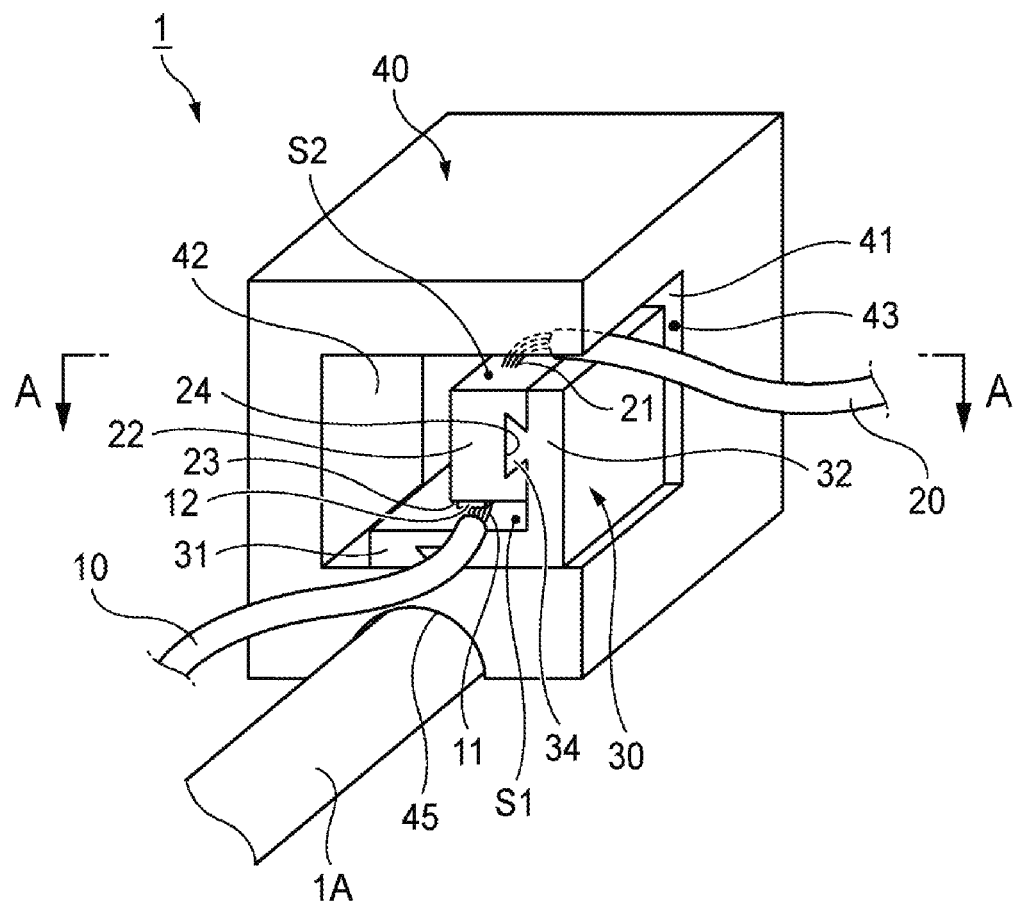
FIG. 2 is a perspective view illustrating a state where a connector holder shown in FIG. 1 holds an attachment and is stacked and installed on a trunk line of the wire harness.
Figure 2:
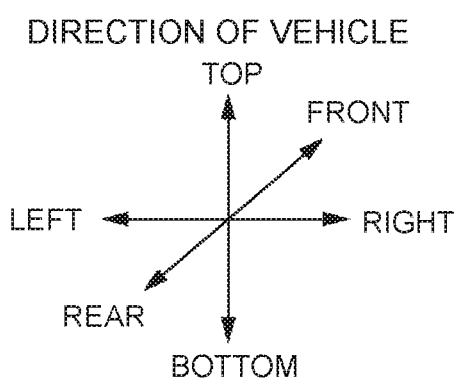
Figure 3:
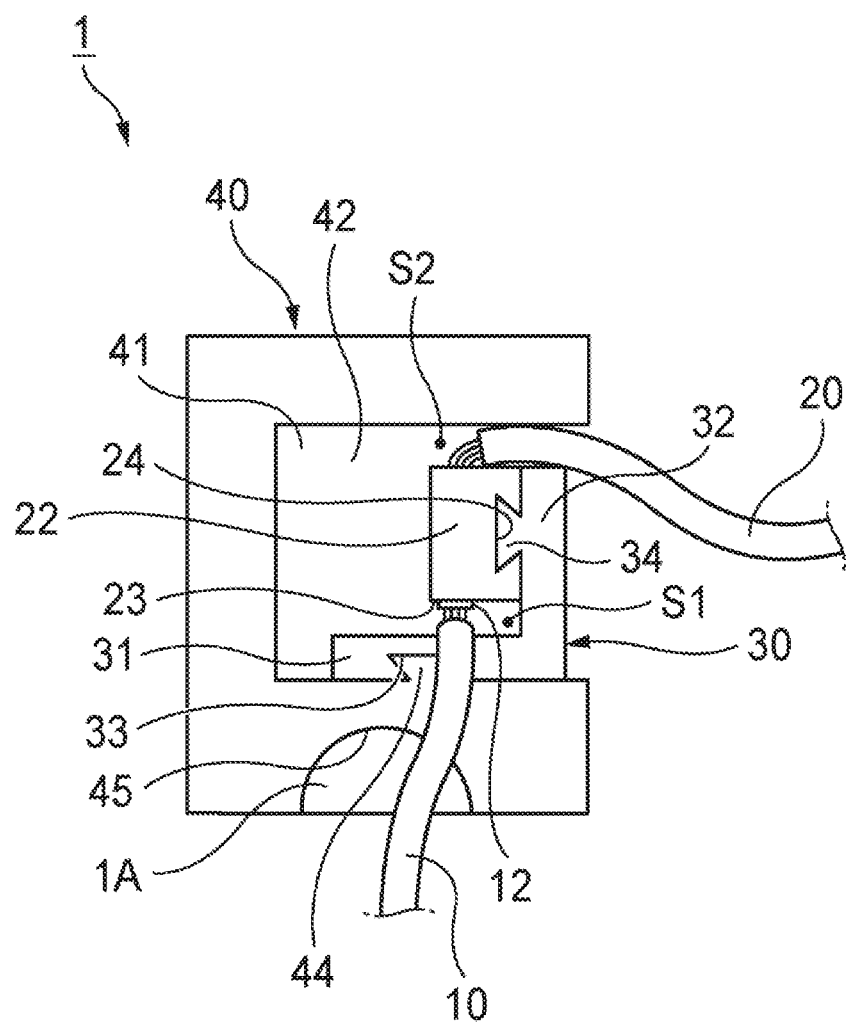
FIG. 3 is a front view illustrating the state shown in FIG. 2.
Figure 4:
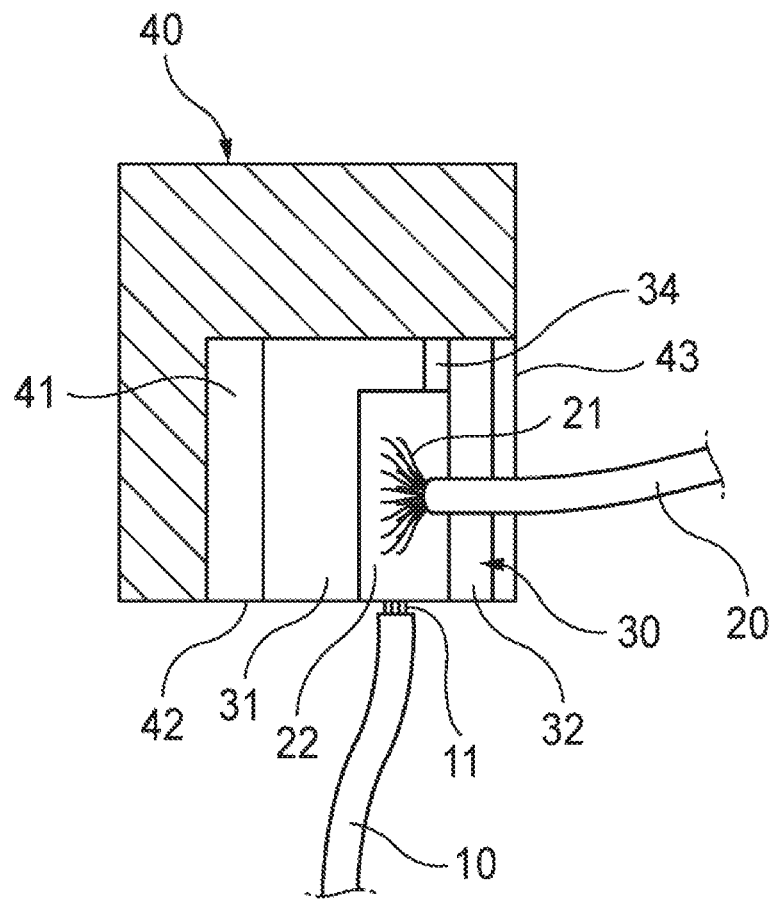
FIG. 4 is a cross-sectional view taken along a line A-A shown in FIG. 2.
Figure 4:
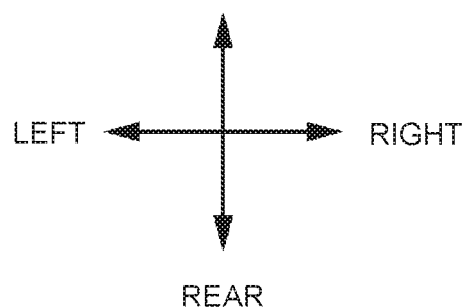

A wire harness 1 according to a first embodiment of the present invention will be described with reference to FIGS. 1 to 4. FIG. 1 is a perspective view illustrating the wire harness 1 according to the present embodiment. FIG. 2 is a perspective view illustrating a state where a connector holder 40 shown in FIG. 1 holds an attachment 30 and is stacked and installed on a trunk line 1A of the wire harness 1. FIG. 3 is a front view illustrating the state shown in FIG. 2. FIG. 4 is a cross-sectional view taken along a line A-A shown in FIG. 2.

Overall Configuration of Wire Harness

First, an overall configuration of the wire harness 1 of the present embodiment will be described.

As shown in FIGS. 1 and 4, the wire harness 1 of the present embodiment is mounted on a vehicle such as an automobile. The wire harness 1 is provided with a trunk line 1A disposed on a vehicle body, the connector holder 40 disposed and stacked on an upper side of the trunk line 1A, and the attachment 30 to be disposed inside the connector holder 40. The wire harness 1 includes a standard sub-harness configured by a plurality of standard electric wires and an optional sub-harness configured by a plurality of selection electric wires. The standard sub-harness and the optional sub-harness are integrally bundled in the trunk line 1A, and the trunk line 1A is configured as an assembly including these sub-harnesses.

In the present embodiment, although the trunk line 1A of the wire harness 1 includes both the standard sub-harness and the optional sub-harness, the invention is not limited thereto. The trunk line 1A may be configured only by the optional sub-harness.

The trunk line 1A is routed to extend in a vehicle front-rear direction. A first electric wire 10 is branched from one side (left side in FIGS. 1 to 4) of the trunk line 1A. A second electric wire 20, which is to be connected to the first electric wire 10 via first and second connectors 12, 22 (to be described later), is an electric wire configuring a part of a sub-harness of another system connected to the trunk line 1A, that is, a branch wire. The first and second electric wires 10, 20 includes a plurality of core wires 11, 21 such as stranded wires as conductors, and each of the plurality of core wires 11, 21 is covered at a periphery thereof with an electrically insulating synthetic resin or the like. In the present embodiment, the first electric wire 10 is drawn out from the optional sub-harness of the trunk line 1A. The second electric wire 20 is a branch wire and is drawn out from the optional sub-harness of another system.

The optional sub-harness includes a plurality of selection electric wires, and in the present embodiment, the first and second electric wires 10, 20 are selection electric wires. The standard sub harness includes a plurality of standard electric wires. At least one of the plurality of standard electric wires and selection electric wires is an electric wire for supplying power, at least another one is a ground wire for grounding, and at least more anther one is a signal line or a communication line for transmitting a signal.

Further, many of the standard electric wires relate to basic functions of a vehicle, for example, a drive system such as an engine or a motor, and are electric wires which are mounted standardly on all vehicles. Meanwhile, many of the selection electric wires relate to additional (optional) functions of a vehicle, such as an acoustic system and a power window system, and are electric wires to be selectively mounted according to the demand of a vehicle customer (driver).

Configuration of Connector of Electrical Wire

Next, the connectors 12, 22 provided at the tip ends of first and second electric wires 10, 20 will be described.

As shown in FIGS. 1 to 4, the first connector 12 is provided at the tip end of the first electric wire 10. The first connector 12 is a male connector, and is formed in a flat box shape by an electrically insulating synthetic resin or the like. A plurality of conductive connection-receiving portions (not shown) are provided on one end surface of the first connector 12 to be fitted to the second connector 22 of the second electric wire 20 to be described later. The connection-receiving portions are electrically connected to the plurality of core wires 11 of the first electric wire 10 respectively. The first electric wire 10 is connected to the other end surface of the first connector 12 via the core wires 11 of the first electric wire 10. That is, the first electric wire 10 is drawn out from a surface opposite the one end surface of the first connector 12.

The second connector 22 is provided at the tip end of the second electric wire 20. The second connector 22 is a female connector, and is formed substantially in a box shape by an electrically insulating synthetic resin or the like. One end surface of the second connector 22 is provided as an opening surface 23, and an opening 23A to be fitted to the first connector 12 is formed (with reference to FIG. 1). In the opening 23A of the second connector, a plurality of conductive connection portion (not shown) are provided to be exposed. The plurality of connection portions are electrically connected to the plurality of core wires 21 of the second electric wire 20, respectively. The second electric wire 20 is connected to the other end surface of the second connector 22 via the core wires 21 of the second electric wire 20. That is, the second electric wire 20 is drawn out from a surface opposite the opening surface 23 of the second connector 22.

On one of side surfaces orthogonal to the opening surface 23 of the second connector 22 (a lower side surface in FIG. 1), a slit-shaped engagement groove 24 is provided to extend in a direction orthogonal to an opening direction of the opening surface 23 of the second connector 22 (upper-lower direction) and a height direction of the second connector (width direction of the second connector 22). The engagement groove 24 of the second connector 22 is formed corresponding to a shape of an engagement protrusion 34 of the attachment 30 to be described later.

Further, the first connector 12 of the first electric wire 10 is internally fitted in the second connector 22 of the second electric wire 20, and is connected to the second connector 22 in a state of being housed inside the second connector 22 of the second electric wire 20. By the connection, the second electric wire 20 is electrically connected to the first electric wire 10 via the first and second connectors 12, 22.

Configuration of Attachment

Next, a configuration of the attachment 30 will be described.

As shown in FIGS. 1 to 4, the attachment 30 is formed of an electrically insulating synthetic resin or the like, and is attached to the second connector 22 of the second electric wire 20. The attachment 30 is formed in a substantially L shape as a Whole, and includes a rectangular flat plate-shaped first wall 31 which is an installation base, and a similarly rectangular flat plate-shaped second wall 32 which is erected from the first wall 31.

In an outer end surface of the first wall 31, a slit-shaped engagement groove 33 is provided to extend in a direction along a line of intersection between surfaces of the first and second walls 31, 32. The engagement groove 33 of the attachment 30 is formed corresponding to a shape of an engagement protrusion 44 of the connector holder 40 to be described later. On an inner end surface of the second wall 32, an engagement protrusion 34 with a rib shape corresponding to the engagement groove 24 of the second connector 22 is provided to extend similarly in the direction along the line of intersection between the surfaces of the first and second walls 31, 32.

In the present embodiment, the engagement groove 24 of the second connector 22 is provided as a dovetail groove, and the engagement protrusion 34 of the attachment 30 is provided as a corresponding tenon portion. Therefore, when the second connector 22 is attached to the attachment 30, the engagement groove 24 of the second connector 22 and the engagement protrusion 34 of the attachment 30 are fitted to each other in a dovetail groove structure. The second connector 22 and the attachment 30 are integrally and firmly connected by the fitting.

The second connector 22 and the attachment 30 according to the present embodiment is not limited to the dovetail groove structure as long as the second connector 22 and the attachment 30 can be engaged with and connected to each other. For example, the engagement groove of the second connector 22 and the engagement protrusion of the attachment 30 may be formed in arc shapes corresponding to each other.

Further, as shown in FIGS. 2 to 4, the second connector 22 is connected to the attachment 30 in a state where the first and second connectors 12, 22 are fitted to each other. In the connection state, the first wall 31 faces the opening surface 23 of the second connector 22 and the second wall 32 faces the side surface of the second connector 22. In this way, the attachment 30 regulates a posture of the second connector 22 in the state of being fitted to the first connector 12. The attachment 30 is provided such that a first gap S1 exists between the opening surface 23 of the second connector 22 and an inner end surface of the first wall 31 of the attachment 30 when being connected with the second connector 22. The first electric wire 10 is drawn around using the first gap S1 (with reference to FIGS. 2 and 3). The second connector 22 is attached so as not to be exposed to the outside from a tip end surface of the second wall 32 of the attachment 30 when being connected (with reference to FIGS. 2 and 3).

Configuration of Connector Holder

Next, a configuration of the connector holder 40 will be described.

As shown in FIGS. 1 to 4, the connector holder 40 is formed substantially in a box shape by an electrically insulating synthetic resin or the like. A part of side surfaces of the connector holder 40A defines a substantially box-shaped holding space 41 for holding the attachment 30 to which the second connector 22 is attached therein. The holding space 41 is formed by cutting two adjacent side surfaces of the connector holder 40 in a circumferential direction around a boundary of the two side surfaces. Therefore, in the holding space 41 of the connector holder 40, a first opening 42 is formed on a side surface of one side (rear side in FIGS. 1 and 2) of the two adjacent side surfaces, and a second opening 43 is formed on a side surface of the other side (right side in FIGS. 1 and 2). The first and second openings 42, 43 are in communication with each other in the circumferential direction.

As shown in FIGS. 1 to 3, on a lower surface of the holding space 41, the engagement protrusion 34 corresponding to the engagement groove 33 of the attachment 30 is provided to extend in a direction orthogonal to the side surface on one side (rear side in FIGS. 1 and 2). The engagement groove 33 of the attachment 30 and the engagement protrusion 44 of the connector holder 40 are similarly formed to be mutually engageable in a dovetail groove structure.

As shown in FIGS. 2 to 4, the connector holder 40 is provided such that, when holding the attachment 30 to which the second connector 22 is attached, a second gap S2 exists between the other end surface of the second connector 22 (the surface opposite the opening surface 23) and an upper surface of the holding space 41. When being held, the attachment 30 regulates a posture of the second connector 22 such that the second electric wire 20 is drawn into the holding space 41 of the connector holder 40. Then, the second electric wire 20 is routed to pass through the second gap S2 and the second opening 43 of the holding space 41. That is, the connector holder 40 holds the attachment 30 such that the first wall 31 is parallel to a direction in Which the second electric wire 20 is drawn out from the connector holder 40, and the second wall 32 is positioned forward in the drawing direction.

The shapes (dovetail groove structure) of the engagement groove 33 of the attachment 30 and the engagement protrusion 44 of the connector holder 40 of the present embodiment is not limited as long as the attachment 30 can be engaged with and held in the holding space 41 of the connector holder 40. For example, the engagement groove of the attachment 30 and the engagement protrusion of the connector holder 40 may be formed in arc shapes corresponding to each other.

Further, as shown in FIGS. 1 to 3, a housing groove 45 for housing the trunk line 1A therein is formed on one surface of the connector holder 40 facing the trunk line 1A, that is, on a back surface of the connector holder 40. A cross section of the housing groove 45 is formed in an arc shape with a predetermined gap with respect to a cross-sectional outer shape of the trunk line 1A.

The cross section of the housing groove 45 of the connector holder 40 may be formed substantially in a C shape such that a width of an opening of the housing groove 45 is smaller than a diameter of the arc. In this case, the trunk line 1A can be held stably inside the housing groove 45.

Procedure for Attaching Attachment to Connector Holder

Next, a procedure for attaching the attachment 30 to the holding space 41 of the connector holder 40 will be described.

In the wire harness 1 configured as described above, first, the first connector 12 of the first electric wire 10 is fitted to the second connector 22 of the second electric wire 20. By the fitting, the second electric wire 20 is electrically connected with the first electric wire 10 via the first and second connectors 12, 22.

As shown in FIGS. 2 to 4, in the second connector 22 to which the first connector 12 is fitted, the engagement protrusion 34 of the attachment 30 is inserted along an extending direction thereof into the engagement groove 24 of the second connector 22. By the insertion, the second connector 22 to which the first connector 12 is fitted is firmly held by the attachment 30.

In the attachment 30 to which the second connector 22 is attached as described above, the engagement protrusion 44 of the connector holder 40 is inserted along an extending direction thereof into the engagement groove 33 of the attachment 30. By the insertion, the connector holder 40 firmly holds the attachment 30 which regulates a posture of the second connector 22 such that the second electric wire 20 is drawn into the holding space 41 of the connector holder 40. Then, the second electric wire 20 is routed to pass through the second gap S2 and the second opening 43 of the holding space 41. When being routed, the second electric wire 20 is bent at a substantially right angle (90°) at a part of the electric wire 20 and forcibly bypassed. The first electric wire 10 is routed to pass through the first gap S1 and the first opening 42 of the holding space 41.

Advantage of Wire Harness of First Embodiment

As described above, the wire harness 1 according to the present embodiment includes the first electric wire 10 which is provided with the first connector 12 at the tip end thereof and is branched from the trunk line 1A, the second electric wire 20 which is provided with the second connector 22 to be connected with the first connector 12 and is to be connected to the first electric wire 10 via the first connector 12 and the second connector 22, the attachment 30 which is to be attached to the second connector 22, and the connector holder 40 for holding the attachment 30 to which the second connector 22 is attached. The connector holder 40 holds the attachment 30 which regulates the posture of the second connector 22 such that the second electric wire 20 is drawn into the connector holder 40. Therefore, the second electric wire 20 is bent at a part thereof inside or at a periphery of the connector holder 40, and thus the second electric wire 20 is bypassed and routed in a planned way. By the bypass, it is possible to absorb and route a length of the second electric wire 20 without changing the length of the second electric wire 20. As a result, the length of the electric wire 20 of the wire harness 1 can be made as uniform as possible, which can lead to standardization of the wire harness 1.

According to the wire harness 1 of the present embodiment, the second electric wire 20 is drawn out from the surface of the second connector 22 on the side opposite the opening surface 23 in which the opening 23A to which the first connector 12 is to be fitted is formed, and the attachment 30 includes the first wall 31, and the second wall 32 which is erected from the first wall 31. The posture of the second connector 22 is regulated such that the first wall 31 faces the opening surface 23 of the second connector 22 and the second wall 32 faces the side surface of the second connector 22. The connector holder 40 holds the attachment 30 such that the first wall 31 is parallel to the direction in which the second electric wire 20 is drawn out from the connector holder 40, and the second wall 32 is positioned forward in the drawing direction. By the holding, the second electric wire 20 is bent substantially at a right angle and is bypassed and routed in a planned way. Therefore, an extra length of the electric wire 20 can be absorbed with a simple structure. Accordingly, the manufacturing cost of the wire harness 1 can be reduced and the working efficiency of routing can be improved.

The wire harness 1 of the present embodiment is particularly useful in a case of using wire harnesses of the same part number in a plurality of vehicle types with different vehicle widths. In a case of using the wire harness in the related art, it is necessary to prepare a plurality of sub-harnesses including electric wires corresponding to the second electric wire 20 of the present embodiment for each vehicle type. The wire harness fits the vehicle width for each vehicle type by using sub-harnesses with different lengths as described above. However, when the sub-harnesses are prepared for each vehicle type, the number of parts in the wire harness will increase as a result. Meanwhile, the wire harness 1 of the present embodiment can fit the vehicle width of each vehicle type by one type of sub-harness (second electric wire 20). The reason is that in a case where the wire length of the second electric wire 20 is longer than the vehicle width, an extra length of the second electric wire 20 is absorbed by winding the second electric wire 20 so as to be drawn into the connector holder 40 using the attachment 30.

Second Embodiment

Figure 5:
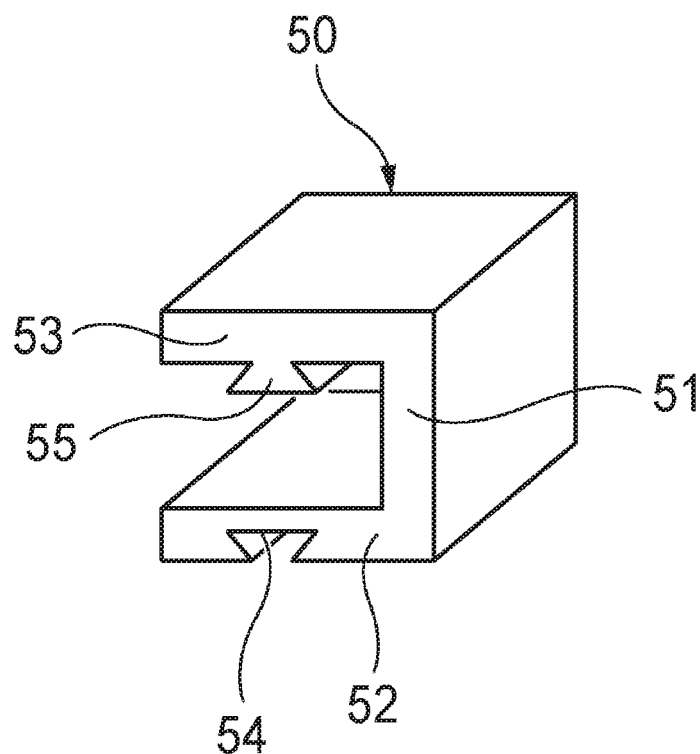
FIG. 5 is a perspective view illustrating an attachment according to a second embodiment of the present invention.
Figure 5:
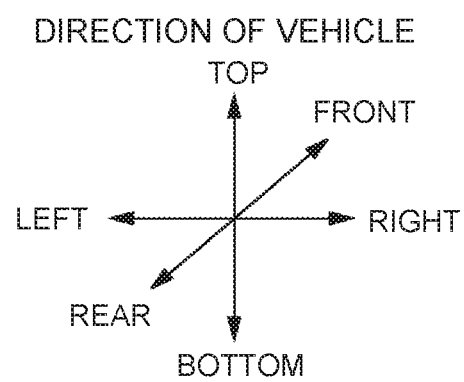
Figure 6:
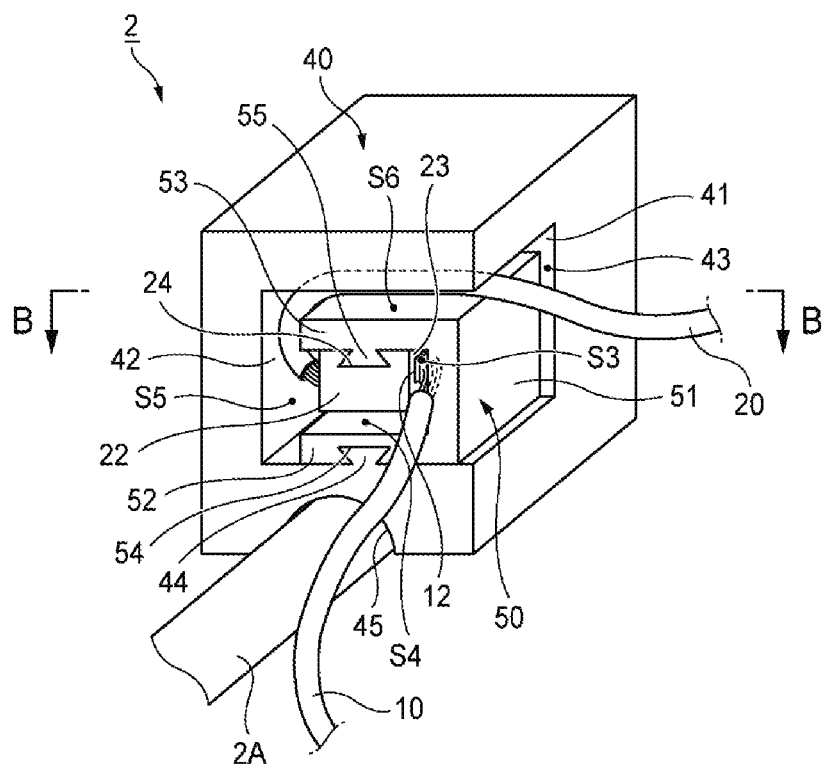
FIG. 6 is a perspective view illustrating a state where a connector holder holds the attachment shown in FIG. 5 and is stacked and installed on a trunk line of a wire harness.
Figure 6:
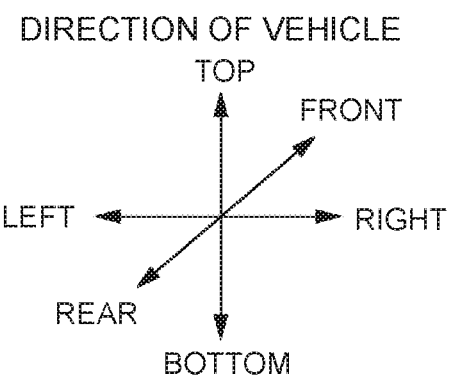
Figure 7:
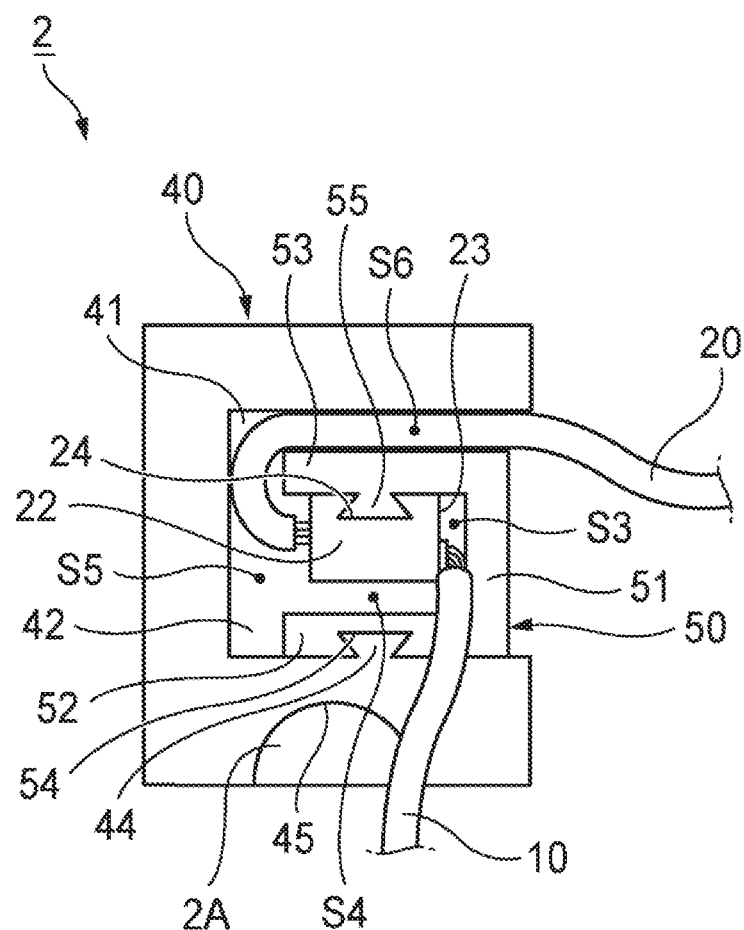
FIG. 7 is a front view illustrating the state shown in FIG. 6.
Figure 7:
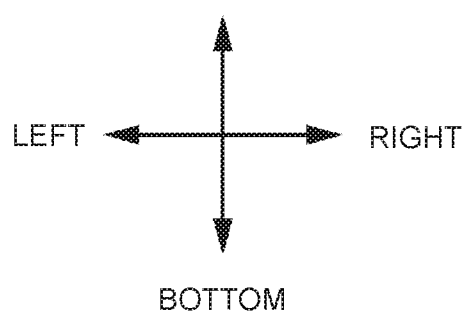
Figure 8:
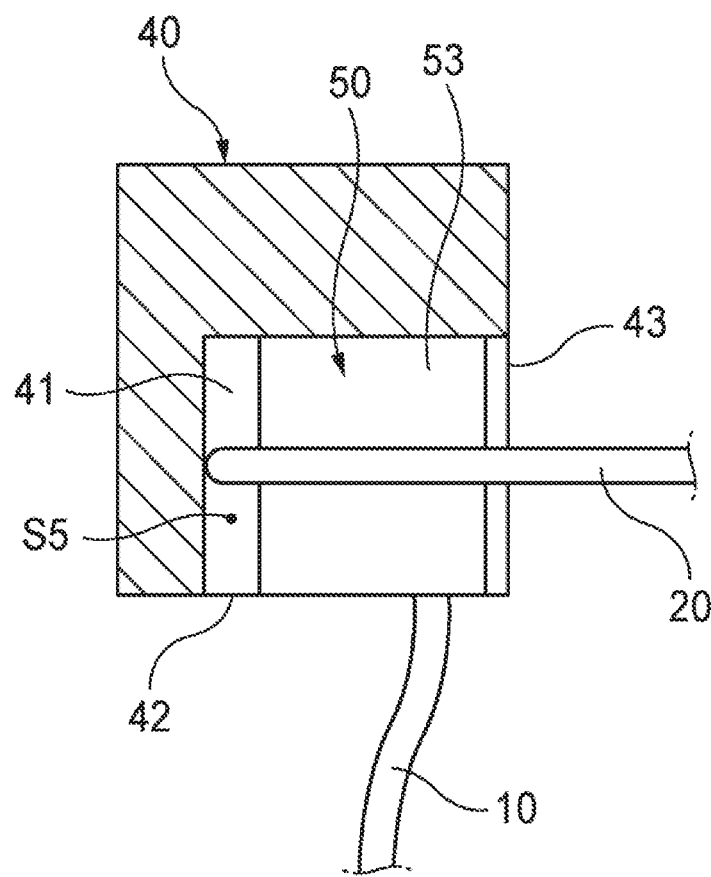
FIG. 8 is a cross-sectional view taken along a line B-B shown in FIG. 6.
Figure 8:
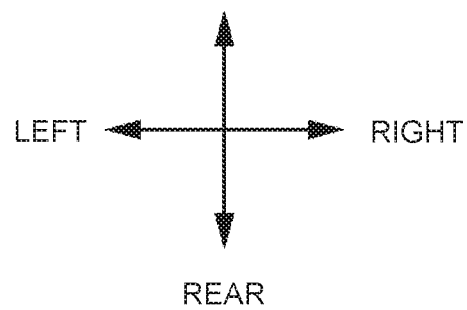

Next, a wire harness 2 according to a second embodiment of the present invention will be described with reference to FIGS. 5 to 8. FIG. 5 is a perspective view illustrating an attachment 50 of the present embodiment. FIG. 6 is a perspective view illustrating a state where the connector holder 40 holds the attachment 50 shown in FIG. 5 and is stacked and installed on a trunk line 2A of the wire harness 2. FIG. 7 is a front view illustrating the state shown in FIG. 6. FIG. 8 is a cross-sectional view taken along a line B-B shown in FIG. 6.

The same or equivalent parts as or to those of the first embodiment are given the same or similar reference numerals in the drawings, and the description thereof is omitted or simplified.

Configuration of Attachment

A structure of the attachment 50 of the present embodiment will be described.

As shown in FIGS. 5 to 8, the attachment 50 of the present embodiment is formed substantially in a U shape as a whole. The attachment 50 includes a rectangular flat plate-shaped first wall 51, a similarly rectangular flat plate-shaped second wall 52 which is erected from one end of the first wall 51, and a similarly rectangular flat plate-shaped third wall 53 which is erected from the other end of the first wall 51 and is positioned to face the second wall 52.

In the present embodiment, the attachment 50 is installed such that when being held in the connector holder 40, the first wall 51 of the attachment 50 extends in the upper-lower direction (height direction). When being installed, the second wall 52 is disposed to face a lower side of the third wall 53.

In an outer end surface of the second wall 52, a slit-shaped engagement groove 54 is provided to extend in a direction along a line of intersection between surfaces of the first and second walls 51, 52. The engagement groove 54 of the attachment 50 is formed corresponding to the shape of the engagement protrusion 44 of the connector holder 40. On an inner end surface of the third wall 53, an engagement protrusion 55 with a rib shape corresponding to the engagement groove 24 of the second connector 22 is provided to extend similarly in the direction along the line of intersection between the surfaces of the first and second walls 51, 52.

In the present embodiment, there is no engagement portion formed on the first wall 51 of the attachment 50.

As shown in FIGS. 6 to 8, the second connector 22 is connected to the attachment 50 in a state where the first and second connectors 12, 22 are fitted to each other. In the connection state, the first wall 51 faces the opening surface 23 of the second connector 22 and the second wall 52 and the third wall 53 face the side surfaces of the second connector 22. In this way, the attachment 50 regulates a posture of the second connector 22 in the state of being fitted to the first connector 12.

The attachment 50 is provided such that a third gap S3 exists between the opening surface 23 of the second connector 22 and an inner end surface of the first wall 51 of the attachment 50 when being connected with the second connector 22. The attachment 50 is provided such that a fourth gap S4 exists between the side surface of the second connector 22 and an inner end surface of the second wall 52 of the attachment 50 when being connected with the second connector 22. The first electric wire 10 is drawn around using the third gap S3 and the fourth gap S4 (with reference to FIGS. 6 and 7).

The attachment 50 is provided such that a fifth gap S5 exists between tip end surfaces of the second and third walls 52, 53 and a side surface of the holding space 41 when being held in the connector holder 40. The attachment 50 is provided such that a sixth gap S6 exists between an outer end surface of the third wall 53 and an upper surface of the holding space 41 when being held. The second electric wire 20 is drawn around using the fifth gap S5 and the sixth gap S6.

Configuration of Connector Holder

Next, a configuration of the connector holder 40 will be described.

As shown in FIGS. 6 to 8, when the connector holder 40 holds the attachment 50 to which the second connector 22 is attached, the attachment 50 regulates the second connector 22 such that the second electric wire 20 is drawn into the holding space 41 of the connector holder 40. Then, as described above, the second electric wire 20 is routed to pass through the fifth gap S5, the sixth gap S6, and the second opening 43 of the holding space 41. That is, the connector holder 40 holds the attachment 50 such that the first wall 51 of the attachment 50 intersects a drawing direction in which the second electric wire 20 is drawn out from the connector holder 40, and the first wall 51 is positioned forward in the drawing direction.

Other configurations are similar to those of the first embodiment.

Procedure for Attaching Attachment to Connector Holder

Next, a procedure for attaching the attachment 50 to the holding space 41 of the connector holder 40 will be described.

As shown in FIGS. 6 to 8, in the wire harness 2 configured as described above, the engagement protrusion 55 of the attachment 50 is inserted along an extending direction thereof into the engagement groove 24 of the second connector 22 to which the first connector 12 is fitted. By the insertion, the first electric wire 10 is routed to pass through the third gap S3, the fourth gap S4, and the first opening 43 of the holding space 41. Further, in the attachment 50 to which the second connector 22 is attached as described above, the engagement protrusion 44 of the connector holder 40 is inserted along the extending direction thereof into the engagement groove 54 of the attachment 50. By the insertion, the second electric wire 20 is routed to pass through the fifth gap S5, the sixth gap S6, and the second opening 43 of the holding space 41. When being routed, the second electric wire 20 is bent to be folded (180°) at a part of the electric wire and forcibly bypassed.

Advantage of Wire Harness of Second Embodiment

According to the wire harness 2 of the present embodiment as described above, the second electric wire 20 is drawn out from the surface of the second connector 22 on the side opposite the opening surface 23 in which the opening 23A to which the first connector 12 is to be fitted is formed. The attachment 50 includes the first wall 51, the second wall 52 which is erected from one end of the first wall 51, and the third wall 53 which is erected from the other end of the first wall 51 and is positioned to face the second wall 52. The posture of the second connector 22 is regulated such that the first wall 51 faces the opening surface 23 of the second connector 22 and the second wall 52 and the third wall 53 face the side surfaces of the second connector 22. The connector holder 40 holds the attachment 50 such that the first wall 51 intersects the drawing direction in which the second electric wire 20 is drawn out from the connector holder 40, and the second wall 52 is positioned forward in the drawing direction. By the holding, the second electric wire 20 is bent to be folded and is bypassed and routed in a planned way. Therefore, an extra length of the electric wire 20 can be absorbed more easily even with a simple structure.

Similarly to the first embodiment, the wire harness 2 of the present embodiment is particularly useful in a case of using wire harnesses of the same part number in a plurality of vehicle types with different vehicle widths. The wire harness 2 of the present embodiment can fit the vehicle width of each vehicle type by one type of sub-harness (second electric wire 20). The reason is that in a case where the wire length of the second electric wire 20 is longer than the vehicle width, an extra length of the second electric wire 20 is absorbed by winding the second electric wire 20 so as to be drawn into the connector holder 40 using the attachment 30. The wire harness 2 of the present embodiment is longer than that of the first embodiment, and the second electric wire 20 is wound so as to be drawn into the connector holder 40.

Other operational effects are similar to those of the first embodiment.

Figure 9:
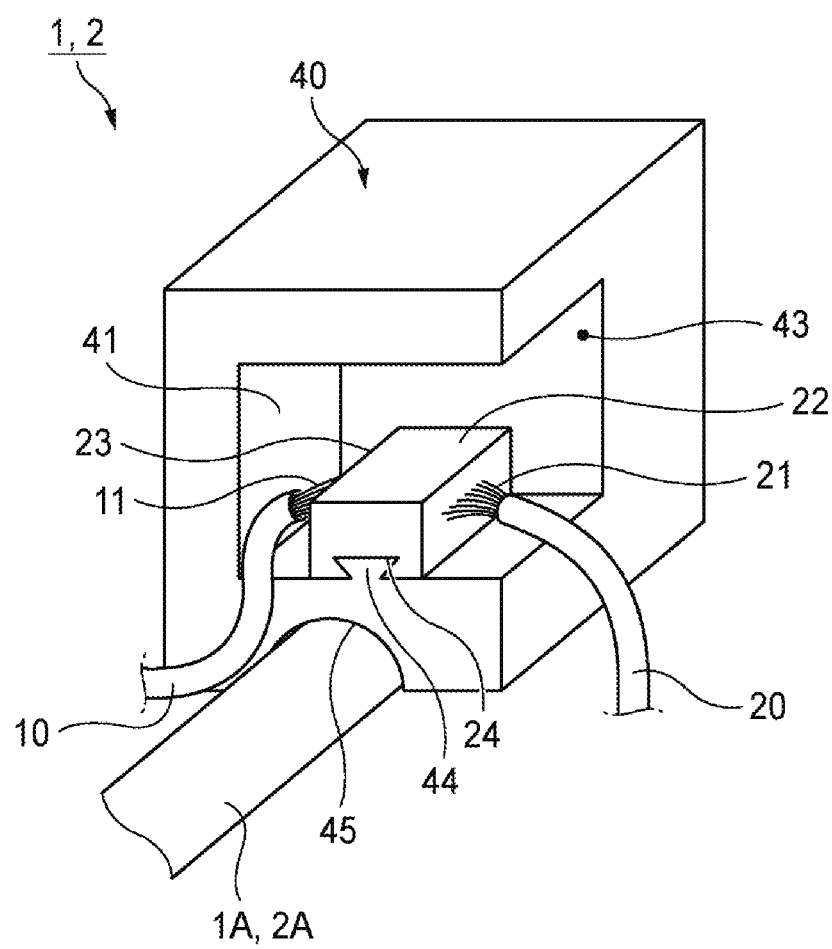
FIG. 9 is a perspective view illustrating a modification of the present invention.

Further, as shown in FIG. 9, the attachment 30, 50 is not used in a modification of the first and second embodiments. Instead, the second connector 22 of the second electric wire 20 is directly attached to and held by the engagement protrusion 44 of the connector holder 40. In this case, an extra length of the electric wire 20 is not required to be absorbed. In this way, by selectively using the wire harness 1 of the first embodiment, the wire harness 2 of the second embodiment, and the wire harness of the modification, the wire harness can fit the vehicle width for each vehicle type by one type of sub-harness (the second electric wire 20).

Next, third to fifth embodiments of the wire harness capable of easily adjusting the extra length of the second electric wire 20 will be described. The same or equivalent parts as or to those of the first and second embodiments are given the same or similar reference numerals in the drawings, and the description thereof is omitted or simplified. The same or equivalent parts in the fourth and fifth embodiments as or to those of the third embodiment are given the same or similar reference numerals in the drawings, and the description thereof is omitted or simplified.

Third Embodiment

Figure 10:
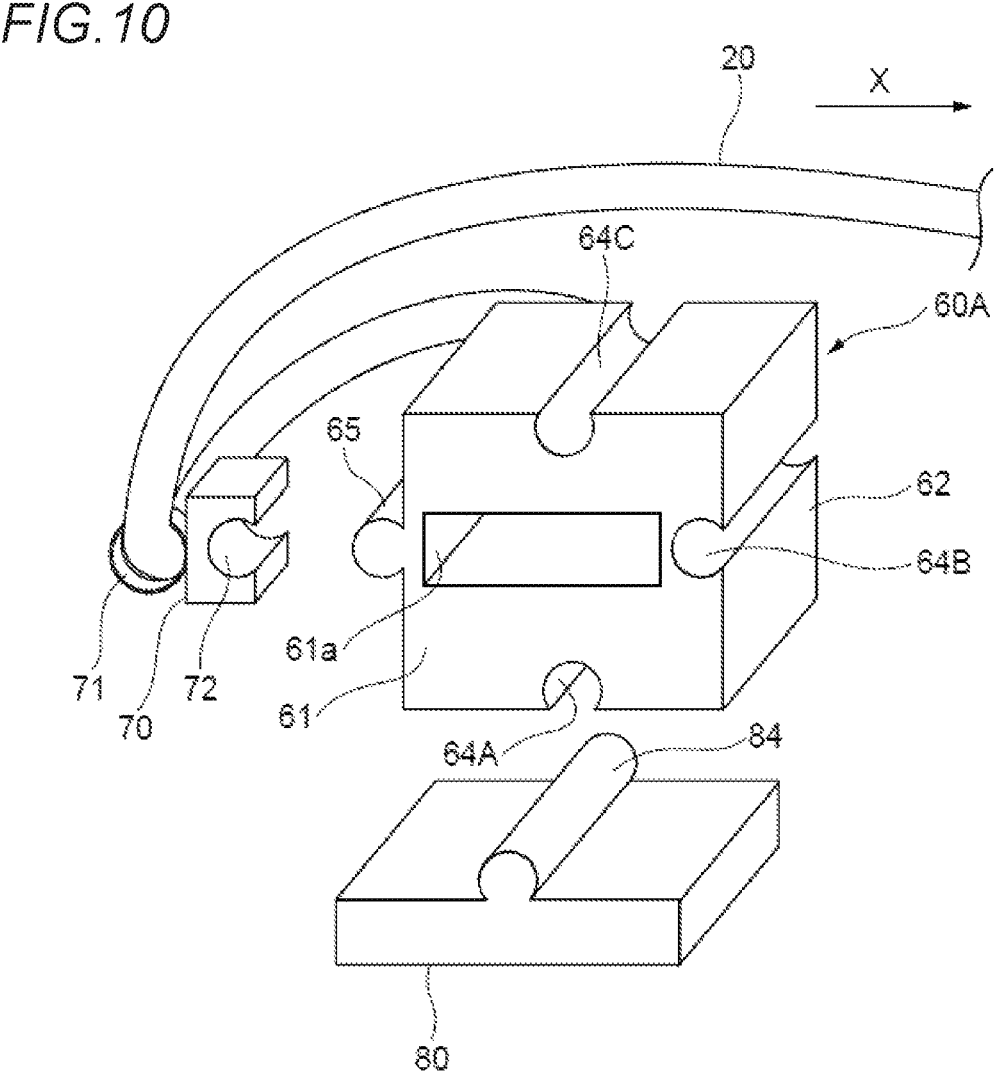
FIG. 10 is a schematic exploded perspective view illustrating a wire harness according to a third embodiment of the present invention.
Figure 11A:
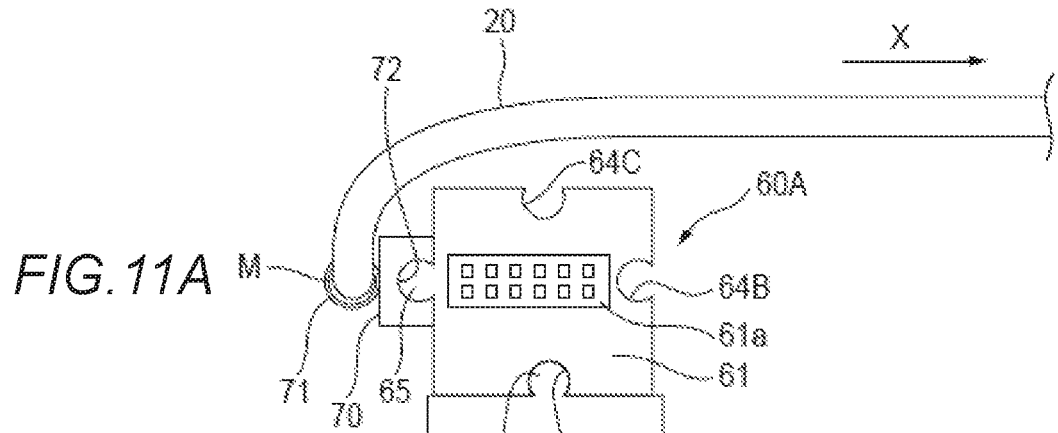
FIGS. 11A to 11C illustrate the wire harness and routing patterns thereof according to the third embodiment of the present invention and FIGS. 11A to 11C are schematic back views illustrating the routing patterns.
Figure 11B:
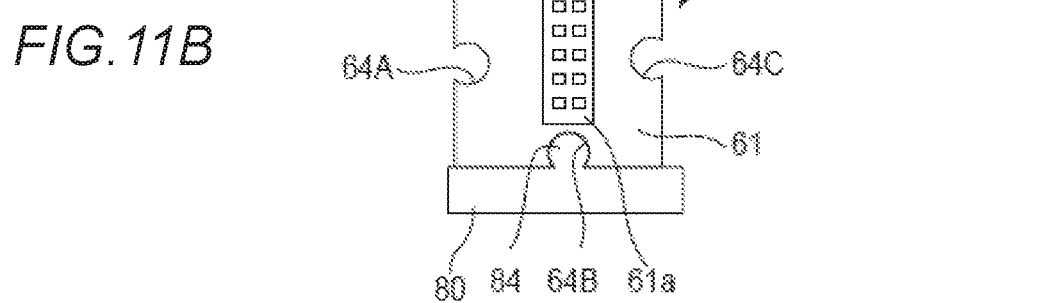
Figure 11C:
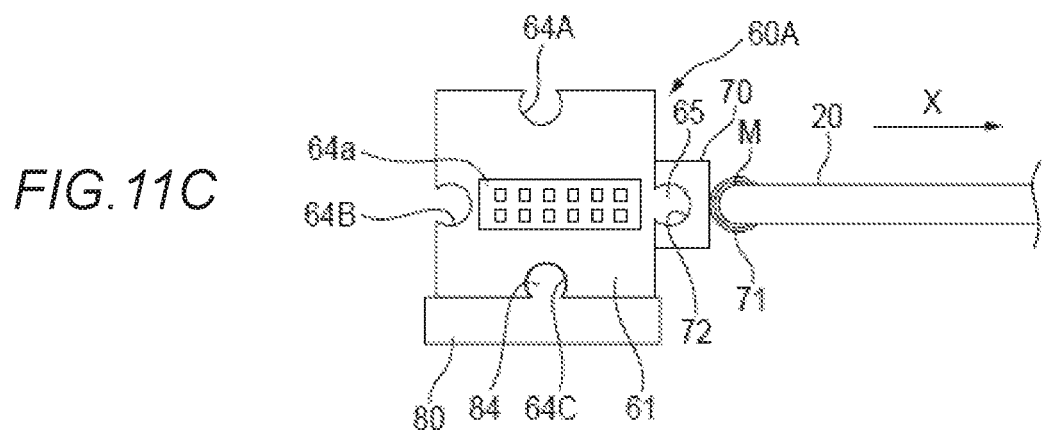

FIG. 10 is a schematic exploded perspective view illustrating a wire harness according to the third embodiment of the present invention. FIGS. 11A to 11C illustrate the wire harness and routing patterns thereof according to the third embodiment of the present invention and FIGS. 11A to 11C are schematic back views illustrating the routing patterns.

As shown in FIG. 10 and FIGS. 11A to 11C, in the third embodiment, a second connector 60A includes an opening surface on a side of a rear surface 61, and an opening 61a into which the first connector 12 is fitted is formed on the opening surface formed by the rear surface 61. The second electric wire 20 is drawn out from a front surface 62 of the second connector 60A. A binding member 70 is attached to the second electric wire 20 drawn from the second connector 60A. The binding member 70 includes a binding band 71 and is attached to the second electric wire 20 by binding the binding band 71 to the second electric wire 20. An engagement groove 72 is formed in the binding member 70.

A plurality of engagement grooves (engagement portions) 64A to 64C extending in the front-rear direction of the second connector 60A are formed on three surfaces (a lower surface, a right surface, and an upper surface as viewed from the rear) of the second connector 60A. The engagement grooves 64A to 64C of the second connector 604 can be engaged with an engagement protrusion 84 of a connector holder 80 to be described later.

An engagement protrusion 65 extending in the front-rear direction of the second connector 60A is formed on one surface (left side surface as viewed from the rear) of the second connector 60A. The engagement groove 72 of the binding member 70 and the engagement protrusion 65 of the second connector 60A are formed to have mutually engageable circular shapes in the cross section. Further, the engagement groove 72 of the binding member 70 is engaged with the engagement protrusion 65 of the second connector 60A, and thus the second electric wire 20 is attached to the one surface on which the engagement protrusion 65 of the second connector 60A is formed. A routing direction X in the second connector 60A is defined on the right side as viewed from the rear, and the second electric wire 20 attached to the second connector 60A is routed in the routing direction X that is one direction (right direction) in the width direction of the vehicle. The engagement groove 72 of the binding member 70 and the engagement protrusion 65 of the second connector 60A may have a dovetail structure having a dovetail groove and a tenon portion to be engaged with each other. The binding member 70 for attaching the second electric wire 20 to the second connector 60A may be directly fixed.

The connector holder 80 is formed in a flat plate shape. The engagement protrusion 84 which corresponds to the engagement grooves 64A to 64C of the second connector 60A and extends in the front-rear direction is formed on an upper surface of the connector holder 80. The engagement grooves 64A to 64C of the second connector 60A and the engagement protrusion 84 of the connector holder 80 are formed to have mutually engageable circular shapes in the cross section. The engagement grooves 64A to 64C of the second connector 604 and the engagement protrusion 84 of the connector holder 80 may have a dovetail structure having a dovetail groove and a tenon portion to be engaged with each other.

Next, a routing method in the third embodiment will be described. In the third embodiment, there are three routing patterns.

(1) First Routing Pattern

As shown in FIG. 11A, the engagement groove 64A of the second connector 60A, which is formed on a side surface to which an attachment position M of the second electric wire 20 is adjacent in a counterclockwise direction as viewed from the rear, is engaged with and assembled to the engagement protrusion 84 of the connector holder 80. By assembling in this way, the attachment position M of the second electric wire 20 attached to the second connector 60A is arranged on a side opposite the routing direction X in the second connector 60A.

(2) Second Routing Pattern

As shown in FIG. 11B, the engagement groove 64B of the second connector 60A, which is formed on a side surface opposite to the attachment position M of the second electric wire 20, is engaged with and assembled to the engagement protrusion 84 of the connector holder 80. By assembling in this way, the attachment position M of the second electric wire 20 attached to the second connector 60A is arranged closer to a routing direction X side of the second electric wire 20 than in the first routing pattern.

(3) Third Routing Pattern

As shown in FIG. 11C, the engagement groove 64C of the second connector 60A, which is formed on a side surface to which the attachment position M of the second electric wire 20 is adjacent in a clockwise direction as viewed from the rear, is engaged with and assembled to the engagement protrusion 84 of the connector holder 80. By assembling in this way, the attachment position M of the second electric wire 20 attached to the second connector 60A is arranged closer to the routing direction X side of the second electric wire 20 than in the second routing pattern.

According to the third embodiment as described above, the engagement grooves 64A to 64C are selectively engaged with the connector holder 80 to change a posture of the second connector 60A, and thus the attachment position M of the second electric wire 20 can be arranged at a plurality of different positions according to the routing direction X. Accordingly, it is possible to adjust and route a drawn length, which is an extra length of the second electric wire 20, without changing the length of the second electric wire 20.

Fourth Embodiment

Figure 12A:
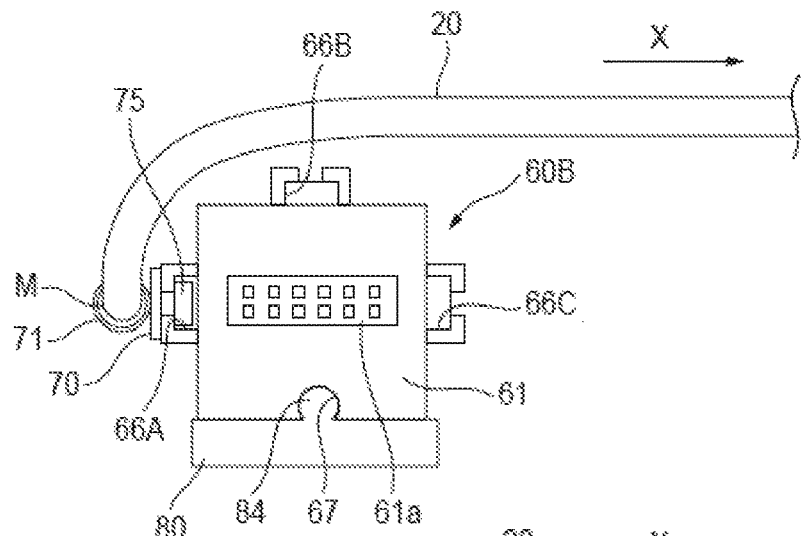
FIGS. 12A to 12C illustrate a wire harness and routing patterns thereof according to a fourth embodiment of the present invention and FIGS. 12A to 12C are schematic back views illustrating the routing patterns.
Figure 12B:
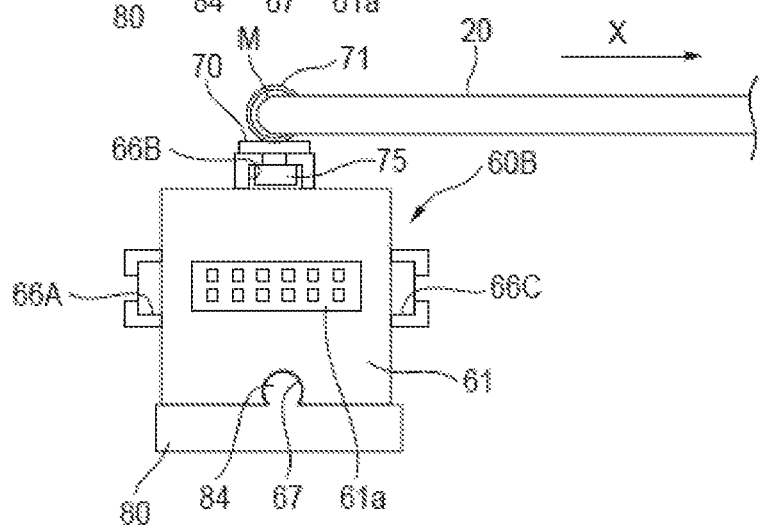
Figure 12C:
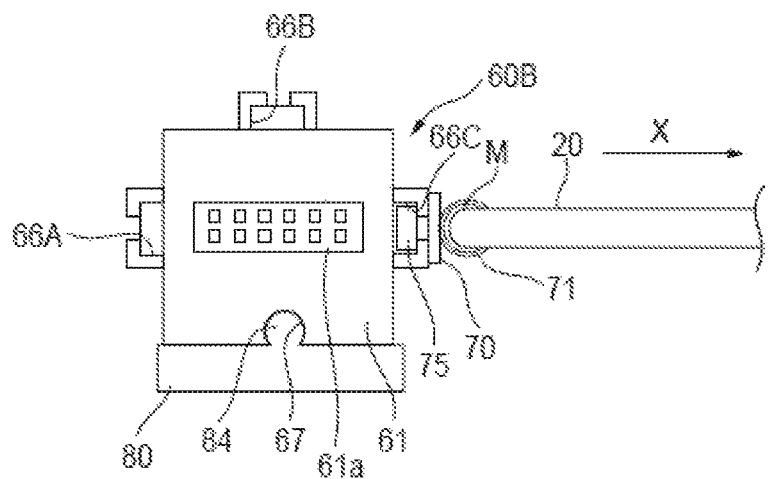

FIGS. 12A to 12C illustrate a wire harness and routing patterns thereof according to a fourth embodiment of the present invention and FIGS. 12A to 12C are schematic back views illustrating the routing patterns.

As shown in FIG. 12A, in the fourth embodiment, a second connector 60B includes a plurality of engagement recesses (engagement portions) 66A to 66C on three surfaces (a left side surface, an upper surface, and a right side surface as viewed from the rear). In the fourth embodiment, a binding member 70 in which an engagement piece 75 is formed is used, and the engagement piece 75 of the binding member 70 can be engaged with the engagement recesses 66A to 66C. Accordingly, the engagement piece 75 of the binding member 70 is engaged with any of the engagement recesses 66A to 66C so as to attach the second electric wire 20.

An engagement groove 67 extending in the front-rear direction of the second connector COB is formed on a lower surface of the second connector 60B. Further, the second connector 60B is assembled to the connector holder 80 by engaging the engagement protrusion 84 of the connector holder 80 with the engagement groove 67.

Next, a routing method in the fourth embodiment will be described. In the fourth embodiment, there are three routing patterns.
(1) First Routing Pattern As shown in FIG. 12A, the engagement piece 75 of the binding member 70 is engaged with and fixed to the engagement recess 66A formed on a left side surface of the second connector 603 as viewed from the rear. Then, the attachment position M of the second electric wire 20 attached to the second connector 60B is arranged on a side opposite the routing direction Y in the second connector 60B.
(2) Second Routing Pattern As shown in FIG. 12B, the engagement piece 75 of the binding member 70 is engaged with and fixed to the engagement recess 66B formed on an upper surface of the second connector 60B as viewed from the rear. Then, the attachment position M of the second electric wire 20 attached to the second connector 60B is arranged closer to the routing direction X side of the second electric wire 20 than in the first routing pattern.

(3) Third Routing Pattern

As shown in FIG. 12C, the engagement piece 75 of the binding member 70 is engaged with and fixed to the engagement recess 66C formed on a right side surface of the second connector 60B as viewed from the rear. Then, the attachment position M of the second electric wire 20 attached to the second connector 60B is arranged closer to the routing direction X side of the second electric wire 20 than in the second routing pattern.

According to the fourth embodiment as described above, the binding member 70 is selectively engaged with the engagement recesses 66A to 66C so as to lock the second electric wire 20 to the second connector 60B, and thus the attachment position M of the second electric wire 20 can be arranged at a plurality of different positions along the routing direction X. Accordingly, it is possible to adjust and route a drawn length, which is an extra length of the second electric wire 20, without changing the length of the second electric wire 20.

Fifth Embodiment

Figure 13A:
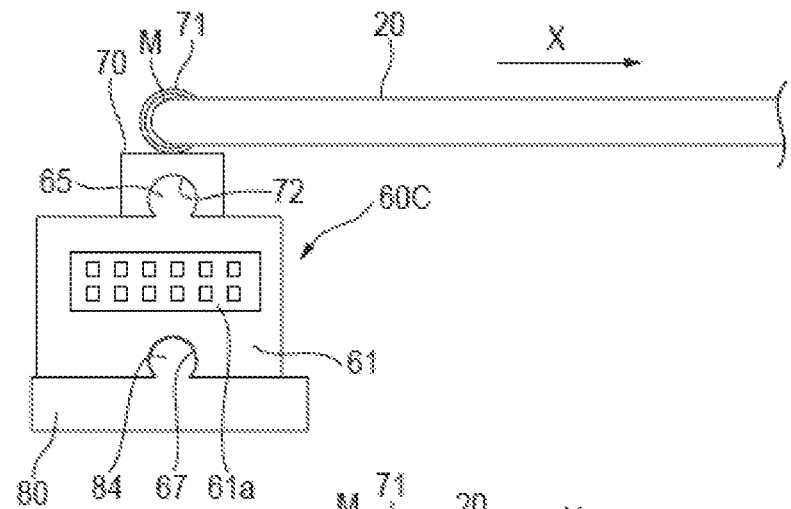
FIGS. 13A to 13C illustrate a wire harness and routing patterns thereof according to a fifth embodiment of the present invention and FIGS. 13A to 13C are schematic back views illustrating the routing patterns.
Figure 13B:
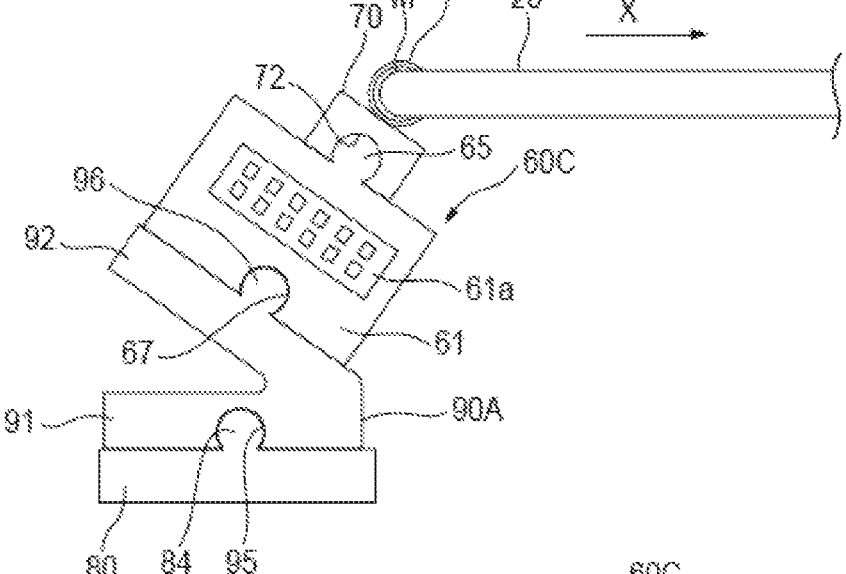
Figure 13C:
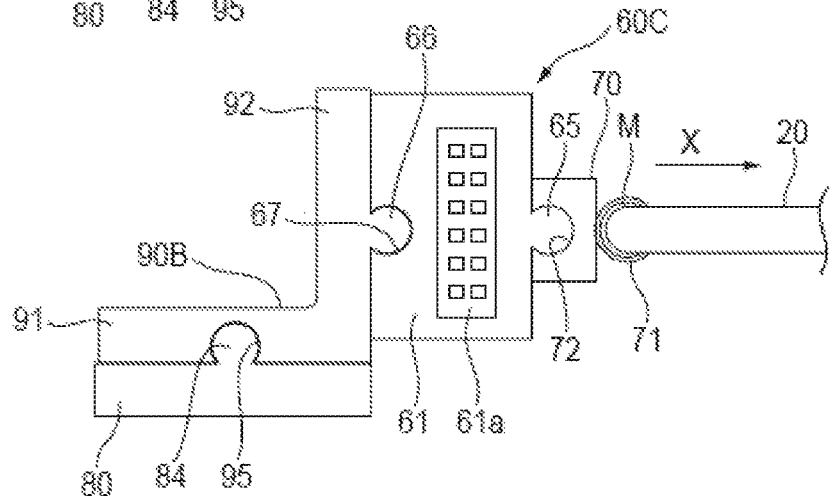

FIGS. 13A to 13C illustrate a wire harness and routing patterns thereof according to a fifth embodiment of the present invention and FIGS. 13A to 13C are schematic back views illustrating the routing patterns.

As shown in FIG. 13A, in the fifth embodiment, a second connector 60C includes, on an upper surface thereof, an engagement protrusion 65 that can be engaged with the engagement groove 72 of the binding member 70 and extends in the front-rear direction of the second connector 60C. Further, the engagement groove 72 of the binding member 70 is engaged with the engagement protrusion 65 of the second connector 60C, and thus the second electric wire 20 is attached to the upper surface of the second connector 60C. The binding member 70 for attaching the second electric wire 20 to the second connector 60C may be directly fixed.

An engagement groove 67 which extends in the front-rear direction of the second connector 60C and can be engaged with the engagement protrusion 84 of the connector holder 80 is formed on a lower surface of the second connector 60C.

Next, a routing method in the fifth embodiment will be described. In the fifth embodiment, there are also three routing patterns.
(1) First Routing Pattern As shown in FIG. 13A, the second connector 60C is directly fixed to the connector holder 80 by engaging the engagement protrusion 84 of the connector holder 80 with the engagement groove 67 of the second connector 60C. Then, the attachment position M of the second electric wire 20 attached to the second connector 60C is arranged on an upper portion of the second connector 60C.
(2) Second Routing Pattern As shown in FIG. 13B, an attachment 90A is used in a second routing pattern. The attachment 90A includes a fixed wall 91 and a support wall 92. The support wall 92 is formed integrally with the fixed wall 91 in an inclined state. An engagement groove 95 that can be engaged with the engagement protrusion 84 of the connector holder 80 is formed in the fixed wall 91, and an engagement protrusion 96 that can be engaged with the engagement groove 67 of the second connector 60C is formed on the support wall 92.

Further, the attachment 90A is fixed to the connector holder 80 by engaging the engagement protrusion 84 of the connector holder 80 with the engagement groove 95 of the fixed wall 91 of the attachment 90A. Furthermore, the second connector 60C is fixed to the attachment 90A by engaging the engagement protrusion 96 of the attachment 90A with the engagement groove 67 of second connector 60C. Then, the second connector 60C is arranged to be inclined toward the routing direction X as compared with the arrangement in the case of the first routing pattern, so that the attachment position M of the second electric wire 20 attached to the second connector 60C is arranged closer to the routing direction X side of the second electric wire 20 than in the first routing pattern.

(3) Third Routing Pattern

As shown in FIG. 13C, an attachment 90B is used in a third routing pattern. In the attachment 90B, the support wall 92 is formed integrally with the fixed wall 91 standing at a substantially right angle with respect to the fixed wall 91.

Further, the attachment 90B is fixed to the connector holder 80 by engaging the engagement protrusion 84 of the connector holder 80 with the engagement groove 95 of the fixed wall 91 of the attachment 90B. Furthermore, the second connector 60C is fixed to the attachment 90B by engaging the engagement protrusion 96 of the attachment 90B with the engagement groove 67 of second connector 60C. Then, the second connector 60C is arranged substantially perpendicular to the routing direction X, so that the attachment position M of the second electric wire 20 attached to the second connector 60C is arranged closer to the routing direction X side of the second electric wire 20 than in the second routing pattern.

According to the fifth embodiment as described above, the second connector 60C is supported by the connector holder 80 directly or via the selectively mounted attachment 90A or 90B, and thus the attachment position M of the second electric wire 20 can be arranged at a plurality of different positions along the routing direction X. Accordingly, it is possible to adjust and route a drawn length, which is an extra length of the second electric wire 20, without changing the length of the second electric wire 20.

The present invention is not limited to the above embodiments, and various modifications can be adopted within the scope of the present invention. For example, the present invention is not limited to the embodiments described above, and may be appropriately modified, improved, or the like, in addition, materials, shapes, dimensions, numbers, disposition locations, or the like of constituent elements in the above-described embodiments are arbitrary and are not limited as long as the present invention can be achieved.

Here, characteristics of the embodiments of the wire harness 1 according to the present invention described above are summarized briefly in the following [1] to [4], respectively.

[1] A wire harness (1, 2) includes: a connector holder (40, 80); a connector (22, 60A, 60B, 60C) to be held by the connector holder (40, 80); and an electric wire (20) extending from the connector (22, 60A, 603, 60C) toward a predetermined routing direction (X), wherein the electric wire (20) is to be held at a predetermined attachment position (M) on an outer wall surface of the connector (22, 60A, 60B, 60C) such that the electric wire (20) extends toward the routing direction (X) passing through the attachment position (M), and the attachment position (M) is configured to be changeable to a plurality of different positions according to the routing direction.

[2] The wire harness (1, 2) described in [1] further includes: a mating electric wire (10) which is branched form a trunk line (1A) and is provided with a mating connector (12) at a tip end thereof, wherein the connector (22, 60A, 60B, 60C) is finable to the mating connector (12), and the electric wire (20) is to be connected to the mating electric wire (10) via the connector (22, 60A, 60B, 60C) and the mating connector (12).

[3] The wire harness (1, 2) described in [2] further includes: an attachment (30, 50) that regulates a posture of the connector (22) with respect to the connector holder (40), wherein the connector (22) is to be held by the connector holder (40) via the attachment (30, 50), and the attachment (30, 50) is to be held by the connector holder (40) in a state where a posture of the connector (22) is regulated such that the electric wire (20) is drawn into a space inside the connector holder (40).

[4] In the wire harness (1) described in [3], the connector (22) is configured such that the electric wire (20) extends rearward in a fitting direction with the mating connector (12), the attachment (30) includes a first wall (31) to be held by the connector holder (40) and a second wall (32) erected from the first wall (31), and regulates the posture of the connector (22) such that the first wall (31) is positioned forward than the connector (22) in the fitting direction, and the second wall (32) is positioned in a direction intersecting the fitting direction of the connector (22) and the electric wire (20) is drawn into the space inside the connector holder (40) while crossing the second wall (32), and is connected to the connector (22) after being bent in the space.

[5] In the wire harness (2) described in [3], the connector (22) is configured such that the electric wire (20) extends rearward in a fitting direction with the mating connector (12), the attachment (50) includes a first wall (51), a second wall (52) that is erected from one end of the first wall (51) and is held by the connector bolder (40), and a third wall (53) that is erected from the other end of the first wall (51) and faces the second wall (52), the attachment (50) regulates the posture of the connector (22) such that the first wall (51) is positioned forward than the connector (22) in the fitting direction, and the second wall (52) and the third wall (53) are positioned in a direction intersecting the fitting direction of the connector (22) and the electric wire (20) is drawn into the space inside the connector holder (40) while crossing the third wall (53), and is connected to the connector (22) after being bent in the space.

[6] In the wire harness (1, 2) described in [1] or [2], the connector (60A) includes a plurality of engagement portions (644 to 64C) engageable with the connector holder (80), and the attachment position (M) is to be changed to a position according to the routing direction (X) by selectively engaging one of the plurality of engagement portions (64A to 64C) with the connector holder (80).

[7] In the wire harness (1, 2) described in [1] or [2], the connector (60B) includes a plurality of engagement portions (66A to 66C) engageable with the electric wire (20), and the attachment position (M) is to be changed to a position according to the routing direction (X) by selectively locking the electric wire (20) to one of the plurality of engagement portions (66A to 66C).

[8] The wire harness (1, 2) described in [1] or [2] further includes one attachment (30) selected form a plurality of types of attachments (90A, 90B) each of which includes a fixed wall (91) to be engaged with the connector holder (80) and a support wall (92) to be engaged with the connector (60C), and in which the support wall (92) is inclined at different angles with respect to the fixed wall (91), wherein
the attachment position (M) is to be changed to a position according to the routing direction (X) by holding the connector (60C) by the connector holder (80) via the one attachment (30) selected from the plurality of types of attachments (90A, 90B).

[9] In the wire harness (1, 2) according to [2],
the trunk line (1A) is routed along a vehicle front-rear direction, and
the electric wire (20) is routed along a vehicle width direction.

What is claimed is:

1. A wire harness comprising:
    a connector holder including a first engagement portion;
    a connector to be held in the connector holder and including a second engagement portion;
    an attachment, including a third engagement portion, that regulates a position of the connector with respect to the connector holder; and
    an electric wire extending from the connector toward a predetermined routing direction,
    wherein the electric wire is held at a predetermined attachment position on an outer wall surface of the connector such that the electric wire extends toward the routing direction passing through the attachment position,
    the connector holder and the connector are configured to be connected to each other in each of a plurality of different positions according to the routing direction such that the attachment position of the electric wire has a different orientation with respect to the connector holder in each of the different positions in which the connector holder is connected to the connector, wherein
    the first engagement portion is in mating engagement with the second engagement portion of the connector in a first one of the different orientations, and
    the first engagement portion is in mating engagement with the third engagement portion of the attachment and the second engagement member of the connector engages the attachment in a second one of the different orientations.

2. The wire harness according to claim 1, further comprising
    a mating electric wire which is branched from a trunk line and is provided with a mating connector at a tip end thereof,
    wherein the connector is fittable to the mating connector, and
    the electric wire is connected to the mating electric wire via the connector and the mating connector.

3. The wire harness according to claim 2,
    wherein the attachment is held in the connector holder in a state where a posture of the connector is regulated such that the electric wire is drawn into a space inside the connector holder.

4. The wire harness according to claim 3,
    wherein the connector is configured such that the electric wire extends rearward in a fitting direction with the mating connector,
    the attachment includes:
        a first wall to be held by the connector holder, and
        a second wall extending from the first wall,
    the attachment regulates the position of the connector such that the first wall is positioned more forward than the connector in the fitting direction, and the second wall is positioned in a direction intersecting the fitting direction of the connector, and
    the electric wire is drawn into the space inside the connector holder while crossing the second wall, and is connected to the connector after being bent in the space.

5. The wire harness according to claim 3,
    wherein the connector is configured such that the electric wire extends rearward in a fitting direction with the mating connector,
    the attachment includes:
        a first wall,
        a second wall that is erected from one end of the first wall and is held by the connector holder, and
        a third wall that is erected from the other end of the first wall and faces the second wall,
    the attachment regulates the position of the connector such that the first wall is positioned more forward than the connector in the fitting direction, and the second wall and the third wall are positioned in a direction intersecting the fitting direction of the connector, and
    the electric wire is drawn into the space inside the connector holder while crossing the third wall, and is connected to the connector after being bent in the space.

6. The wire harness according to claim 2,
    wherein the trunk line is routed along a first direction, and the electric wire is routed along a second direction that intersects the first direction.

7. A wire harness comprising:
    a connector holder including a first engagement portion;
    a connector to be held in the connector holder and including a second engagement portion; and
    an electric wire extending from the connector toward a predetermined routing direction,
    wherein the electric wire is held at a predetermined attachment position on an outer wall surface of the connector such that the electric wire extends toward the routing direction passing through the attachment position,
    the connector holder and the connector are configured to be connected to each other in each of a plurality of different positions according to the routing direction such that the attachment position of the electric wire has a different orientation with respect to the connector holder in each of the different positions in which the connector holder is connected to the connector,
    the connector is held in the connector holder in a first one of the different positions when the second engagement portion engages the first engagement portion, and
    the connector is held in the connector holder in a second one of the different positions when the second engagement portion is spaced away from the first engagement portion,
    wherein the connector includes a plurality of second engagement portions spaced about the connector and selectively engageable with the connector holder, and the attachment position is changed to a first one of the different positions according to the routing direction by selectively engaging a first one of the plurality of second engagement portions with the connector holder, and the attachment position is changed to a second one of the different positions according to the routing direction by selectively engaging a second one of the plurality of second engagement portions with the connector holder.

8. A wire harness comprising:

a connector holder;

a connector to be held in the connector holder; and an electric wire extending from the connector toward a predetermined routing direction, wherein the electric wire is held at a predetermined attachment position on an outer wall surface of the connector such that the electric wire extends toward the routing direction passing through the attachment position, the connector holder and the connector are configured to be connected to each other in each of a plurality of different positions according to the routing direction such that the attachment position of the electric wire has a different orientation with respect to the connector holder in each of the different positions in which the connector holder is connected to the connector, and the connector includes a plurality of engagement portions engageable with the electric wire, and the attachment position is changed to a position according to the routing direction by selectively locking the electric wire to one of the plurality of engagement portions.

9. A wire harness comprising:

a connector holder;

a connector to be held in the connector holder; and an electric wire extending from the connector toward a predetermined routing direction, wherein the electric wire is held at a predetermined attachment position on an outer wall surface of the connector such that the electric wire extends toward the routing direction passing through the attachment position, the attachment position is configured to be changeable to a plurality of different positions according to the routing direction, one attachment selected from a plurality of types of attachments each of which includes a fixed wall and a support wall inclined at an angle relative to the fixed wall, each angle is different, and each fixed wall is configured to be engaged with the connector holder and each support wall is configured to be engaged with the connector, and the attachment position is changed to a position according to the routing direction by holding the connector by the connector holder via the one attachment selected from the plurality of types of attachments.

* * * * *